(12) United States Patent
Grob

(10) Patent No.: US 9,211,617 B2
(45) Date of Patent: Dec. 15, 2015

(54) MACHINE TOOL WITH A DRIVE SHAFT

(75) Inventor: Burkhart Grob, Bad Wörishofen (DE)

(73) Assignee: Grob-Werke GmbH & Co. KG, Mindelheim (DE)

( * ) Notice: Subject to any disclaimer, the term of this patent is extended or adjusted under 35 U.S.C. 154(b) by 591 days.

(21) Appl. No.: 13/037,610

(22) Filed: Mar. 1, 2011

(65) Prior Publication Data

US 2011/0214540 A1 Sep. 8, 2011

(30) Foreign Application Priority Data

Mar. 2, 2010 (DE) .................... 10 2010 009 947
Sep. 8, 2010 (DE) .................... 10 2010 044 781

(51) Int. Cl.
*B23Q 3/06* (2006.01)
*B23Q 1/00* (2006.01)

(52) U.S. Cl.
CPC ............... *B23Q 3/06* (2013.01); *B23Q 1/0009* (2013.01); *Y10T 82/2514* (2015.01); *Y10T 82/2552* (2015.01)

(58) Field of Classification Search
USPC ............ 82/162, 165, 142; 279/134, 126, 901; 29/27 C, 28, 27 A, 281; 269/55, 60, 71; 409/131, 132, 164, 165, 168, 189, 197, 409/198, 219, 224, 225
See application file for complete search history.

(56) References Cited

U.S. PATENT DOCUMENTS

| | | | | |
|---|---|---|---|---|
| 1,946,835 A | * | 2/1934 | Buhr | 269/70 |
| 4,006,650 A | * | 2/1977 | Elmer | 74/813 C |
| 4,678,381 A | * | 7/1987 | Bailey | 409/221 |
| 5,201,249 A | * | 4/1993 | Sterenberg | 74/825 |
| 6,629,697 B1 | * | 10/2003 | Asai et al. | 279/134 |
| 7,770,499 B2 | * | 8/2010 | Biertz et al. | 82/104 |
| 8,087,858 B2 | * | 1/2012 | Martin | 409/221 |
| 2007/0057135 A1 | | 3/2007 | Hanaoka et al. | |
| 2007/0228670 A1 | * | 10/2007 | Norton et al. | 279/2.11 |
| 2008/0157707 A1 | * | 7/2008 | Jeske et al. | 318/723 |

FOREIGN PATENT DOCUMENTS

| | | |
|---|---|---|
| DE | 202006004942 | 8/2007 |
| DE | 102008034728 A1 * | 1/2010 |
| EP | 2210699 | 7/2010 |
| WO | WO 2006/003683 | 1/2006 |

OTHER PUBLICATIONS

English Translation of DE 102008034728A1, Jan. 2010.*
Complete human translation of DE102008034828A1, Jan. 2010.*

* cited by examiner

*Primary Examiner* — Sunil K Singh
*Assistant Examiner* — Alan Snyder
(74) *Attorney, Agent, or Firm* — Loginov & Associates, PLLC; William A. Loginov

(57) ABSTRACT

Machine tool for machining one or more work piece(s) with a drive shaft driven by a drive with an adapter fitting for the optional connection of the drive shaft with a clamping device or a lathe chuck.

18 Claims, 3 Drawing Sheets

MACHINE TOOL WITH A DRIVE SHAFT

BACKGROUND OF THE INVENTION

Figure 1:
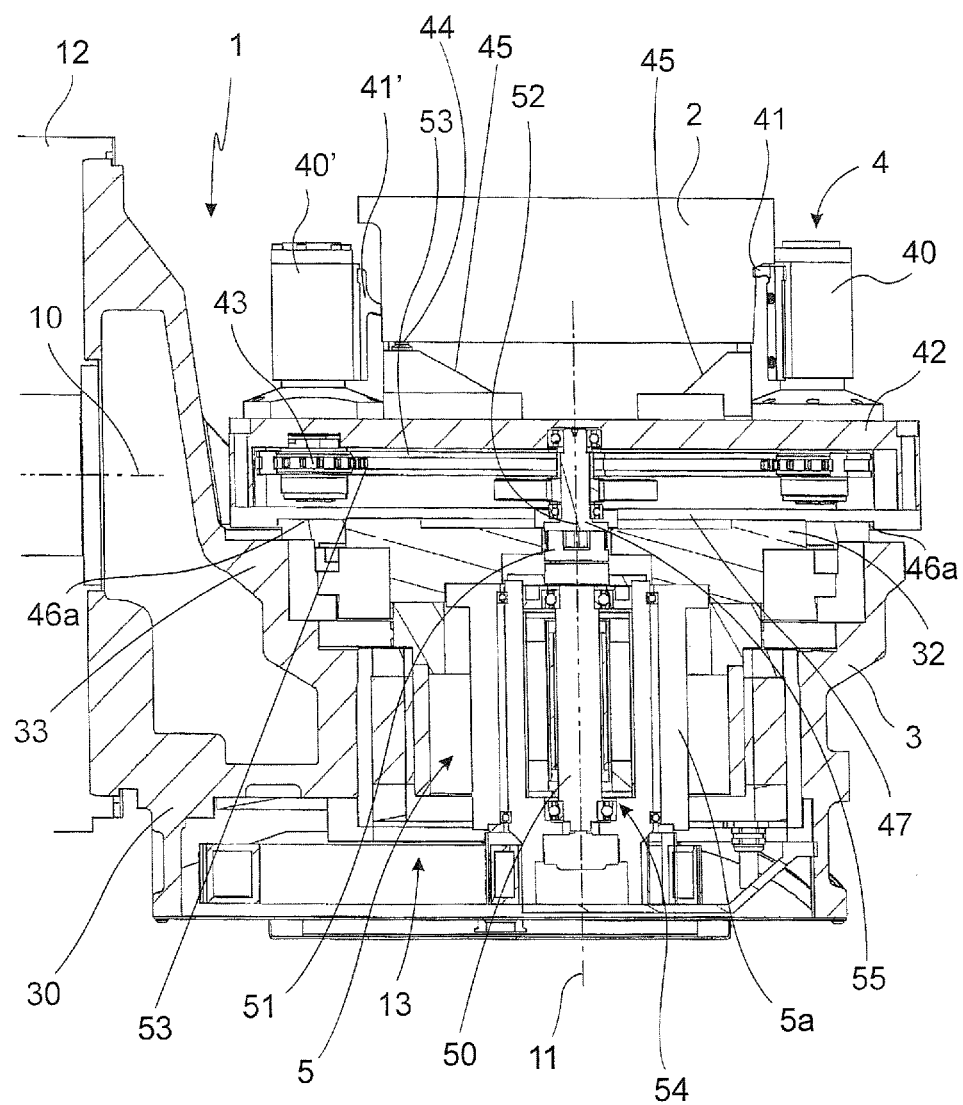

The invention refers to a machine tool for machining one or more work pieces, wherein the machine tool has a work piece carrier carrying the work piece(s).

Machine tools mentioned above are sufficiently known, for example, as metal-cutting machine tools, in particular in so-called machining centers.

Usually, the arrangement is here chosen in such a way that the work piece is clamped on a work piece carrier, and the work piece carrier is either stationary in the space or can move along or around one or more longitudinal or rotational axes. The metal-cutting machining is here done by a machining tool driven rotary by a spindle drive, and wherein the spindle can be angled in an appropriate way against the work piece. The same is achieved by the fact that the work piece carrier can be positioned in the space.

In the state of the art here the machining tool driven by the spindle rotates and thus carries out the metal-cutting machining, for example milling or drilling.

BRIEF ABSTRACT OF THE INVENTION

It is an object of the present invention to widen the field of application of machine tools mentioned before.

In order to solve this problem the invention refers to a machine tool—as described in the beginning—and suggests that the work piece carrier has a drive shaft driven by a drive, and the drive shaft has an adapter fitting for optional connecting the drive shaft with a means for power transmission for a clamping device serving for an indirect or direct clamping of the work piece, wherein the drive in this application serves for operating the clamping device or for an alternative connection of the drive shaft with a lathe chuck that serves for an indirect or direct reception of the work piece for rotary grinding or turning on a lathe machine on the work piece, and the drive serves to rotate the work piece.

The present invention widens the field of application of the known machine tools considerably. Besides the known metal-cutting machine by a usually rotary driven machine tool, the present invention also provides turning on a lathe machine. Because of the NC-controlled axes of the spindle, the machine tool can be positioned along one, two or three spatial axes relatively to the work piece. Therefore the machine tool does not (necessarily) rotate in this application, but can nevertheless be moved and positioned along the axes.

An essential advantage of the machine tool is that all accuracy features known for metal cutting machining with rotary machine tools can also be used for turning on a lathe machine. The embodiment is here realized in such a way, that the effort for resetting is very low, and allows for quick modification of the work piece carrier. To carry out this quick modification, the adapter fitting is designed with a quick connection link, quick coupling, claw coupling, screw connection or bayonet connector. All possible connecting types can be used that are seen as useful and compatible with the machine tool. The goal is to provide a connection that allows with only a few flicks of the wrist, an exchange of the means of power transmission of a clamping device that clamps the work piece for a lathe chuck.

If the means for power transmission for the clamping device clamping the work piece is arranged on the adapter fitting, the drive shaft acts as the means for power transmission. The work piece carrier may be stationary in this embodiment.

However, if via the adapter fitting a lathe chuck is arranged, via the adapter fitting a direct connection of the drive shaft to the lathe chuck is carried out so that a work piece received in the lathe chuck can be moved in a rotary fashion. A machining tool angled against the work piece that can be positioned preferably along one, two or three spatial axes relatively to the work piece then removes in a turning on a lathe or grinding process material from the work piece and thus effects its deformation.

The driving motor is here designed stationary in a work piece table, if necessary integrated in a rotary table. Via the adapter fitting on the drive shaft the driving motor designed preferably as hydraulic or electric motor then fulfils its function as clamping drive for the clamping elements of the clamping device, if in the machine tool a clamping device is used for fixing the work piece. If the clamping device is removed, the driving motor remains in the work piece table and the adapter fitting is free for receiving, for example, a lathe chuck or another receiving device for a work piece for its rotary grinding or turning on a lathe machining. The driving motor then drives the lathe chuck or the work piece clamped or held in it, and sets it is rotary motion.

It is seen as favorable opportunity for the driving motor if it is provided as electric or hydraulic motor. The motor serves for driving the drive shaft that acts in a first embodiment or development of the machine tool on the means for power transmission for the clamping device serving for the indirect or direct clamping of the work piece. In the second alternative design of the machine tool realized on one and the same machine base, the drive shaft or the motor driving it serves for realizing a rotational motion of the work piece or a lathe chuck receiving or holding the work piece, or the like. Means for fixing the work piece to be machined in the lathe chuck then are arranged in it, and are, if necessary, operated independently from the drive of the lathe chuck by suitable actuators.

The efficiency of the machine tool is increased by using instead of expensive hydraulic components one or more electric motor(s) as drive(s), in particular as indirect or direct clamping or rotational drive(s).

It is seen as favorable here, if the drive is designed as electric motor, in particular as servo motor. This electric motor or servo motor can be designed in particular as synchronous, asynchronous or direct current motor. The advantage, if these motors are used, is their compact structure, the sturdy construction and the possibility for operation in a closed control circuit. The operation can be here moment controlled, speed controlled or position controlled.

It is seen as advantageous development when the drive is designed as sensorless synchronous or asynchronous motor. In particular a permanent magnet excited synchronous motor (PMSM) is here preferred. The suggestion comprises here in the same way the arrangement of the permanent magnet(s) as buried magnet(s) or as surface magnet(s) on the rotor, wherein the use of buried magnet(s) in the rotor is seen as particularly advantageous as mechanic stress occur in the bundle of laminations of the rotor and not on the surface. Additionally lower losses occur in the permanent magnet.

The use of permanent magnets on or in the rotor makes the otherwise existing excitation winding in synchronous machines unnecessary.

It is seen as an advantage when sensorless motors, in particular synchronous motors, are employed that here the additional arrangement of sensors or transmitters for the rotor position definition can be dropped, and the size of the construction is reduced accordingly. In the machine tools or the tool or work piece clamping or turning devices provided in them the structural space for the single components is small to be able to realize a construction of the complete machining center as compact as possible. Besides the increase of the efficiency and the dynamic of conventional machine tools the structural space or the requirements of the structural space on the side of the drive can be perfected by the use of sensorless motors.

In an embodiment of the machine tool seen as preferred a sensorless rotor position definition, in particular a sensorless standstill position recognition, is provided that can be realized in particular through the sensorless synchronous motor. Thus, in a sensorless synchronous motor, for example, the position of the rotor can be estimated by means of an anisotropy of the resulting inductance in the used stator coils of the stator. During the operation of the synchronous motor different resulting inductances can be measured depending on the position of the rotor in the stator coils, through which the position of the rotor can be estimated. In this connection it is seen as advantageous when the rotor position definition or the standstill position recognition can be carried out software- or NC-controlled. An appropriate integration in the machine control, for example a machine control comprising a micro controller, can be realized in a simple way.

A preferred possibility for defining the rotor position or the standstill position provides, for example, that measuring signals superimpose the selecting signal for connecting the stator currents for the stator coils in such a way that additionally to the drive magnetic field an alternating magnetic field is generated, wherein the current flows caused by the signals by the stator coils depend on the rotor position depending, resulting inductance of the synchronous motor. The resulting inductivity of the synchronous motor depends on the position of the rotor. The process for the sensorless rotor position definition is based here on the detection of the magnetic anisotropy of the series and shunt inductance of the rotor. If a fast alternating voltage is connected to the motor the voltage in the pillar lane drops almost exclusively on the rotor position depending inductance. The excited current is thus modulated by the rotor position and can be evaluated accordingly. The strength of the signal is proportional to the difference of the series and shunt inductance.

The input and output signals are processed by a control or measuring software or the NC-control, to define through it the rotor position or the standstill position. This again defines the tool use position or the work piece machining position, or the position of the clamping element or the clamping device for the work piece driven by such an electric motor. If necessary, for the evaluation of the rotor position a separate switching circuit or a micro controller programmed for it is provided in the machine control.

The use of synchronous motors has other advantages besides the reduction of the structural space required for the drive. Thus, the expenses for installation are reduced altogether as sensor line, sensor and sensor interface are not required. The synchronous motors make a high dynamic and a slip-free motion possible. Besides the reduced space they also have a lower weight with a nevertheless high efficiency and a high availability. The position definition can be integrated here in a simple way in the machine control of the machine tool; resetting or retrofitting of existing machines is possible.

A preferred embodiment of the machine tool provides that here a work piece carrier that is stationary in the space is provided, and a rotation of the work piece arranged on the work piece carrier is carried out together with the work piece carrier so that a machining of the work piece from several sides can be carried out. Of course, there is also the possibility that the tool carrier as well as also the work piece carrier is designed movable or rotary along at least one or more axes so that the possible machining positions are multiplied.

It is also seen as favorable, if the work piece carrier can be moved and/or rotated along at least one axis. In order to achieve a machining as flexible as possible, the work piece can be designed in such a way that it can be positioned at three spatial axes relatively to the machining tool. Besides the longitudinal axes, however, also rotational axes are provided. The rotational axes make rotating the work piece carrier around a, for example horizontally orientated, rotational axis possible. Besides, there is also the possibility when the work piece carrier is suitably movable or rotary to rotate the work piece also around a vertically orientated rotational axis. For that also the drive for the means for power transmission for impinging the clamping device serving for the indirect or direct clamping of the work piece can be used for the rotational movement of the complete work piece carrier. For that, then appropriate couplings can be arranged in the clamping device, so that after clamping the work piece the drive shaft or the drive itself is available for a rotation of the work piece carrier around the vertical rotational axis.

It is seen as advantageous when the drive acts directly on the drive shaft. Besides, there is, of course, also the possibility that the drive acts only indirectly, for example via a gear or the like, on the drive shaft. Besides the use of a gear, of course, all other possible types of power transmission from drive to drive shaft are employed, if this is seen as useful and can be realized with respect to the geometry of the machine and the desired purpose of use. If the power is transmitted via a gear, there is also the possibility of using a driving motor for the drive of different clamping devices, for example of several lathe chucks.

A preferred embodiment of the machine tool provides that the clamping device that can be operated via the drive shaft of the machine tool has a supporting plate carrying the work piece, and the supporting plate is supported on several points on the work piece carrier. Of course, the supporting plate can also be connected releasable fixedly with the work piece carrier. Here then suitable fastening means, for example screw connections or the like, have to be used to achieve an accurately and reliably positioned connection between supporting plate and work piece carrier. On the supporting plate itself supporting points can be provided for the work piece making an exact positioning of the work piece possible. Thus a highly accurate positioning of the work piece is reached so that the clamping device can engage on clearly defined points of the work piece to clamp it against the supporting plate or the supporting points.

Another preferred embodiment of the machine tool provides that the clamping device has at least one clamping element. This clamping element can be operated here via means for power transmission provided in the clamping device, and serves for fixing the work piece. Thus the clamping elements can have, for example, clamping claws provided longitudinally movable on the clamping element. These clamping claws engage in a defined position on the work piece, and push it to the supporting plate during machining. Of course, here also other clamping means can be used additionally or alternatively to the clamping claws.

An embodiment of the machine tool provides that for operating the clamping elements a means for power transmission is provided connecting the clamping elements with a central drive. This central drive is again connected, for example via the adapter fitting, with the drive shaft that, via the means for power transmission, effects the operation of the clamping elements or the clamping means arranged or shifting on them, and thus eventually clamping of the work piece. For connecting the means for power transmission with the central drive or for power transmission from the central drive to the clamping elements, for example, a chain, a belt or a suitably designed gear can be provided, including a driving pinion with the drive shaft or the adapter fitting arranged or provided on it, and another pinion provided on a spindle of the clamping element, and thus carries out an operating of the clamping elements or the clamping means arranged on it. In order to prevent an excessive clamping which might damage the work piece the gear described here can be designed with a sliding clutch. Monitoring the power consumption of the driving motor makes it possible to monitor the single clamping states of the clamping elements, and to influence them accordingly. Reversing the driving direction of the driving motor releases the work pieces from the clamping elements or the clamping device.

When the clamping device is exchanged for a lathe chuck, the chuck body receiving the rotating part of the lathe chuck is connected with the work piece table to provide a reception or a bearing for the rotating part of the lathe chuck. The chuck body connected with the work piece table has on its interior at least one bearing for the rotating part of the lathe chuck, i.e., the actual spindle, connected via the adapter fitting with the drive shaft. The spindle of the lathe chuck has clamping means to hold the work piece that has to be set in rotation.

To be able to secure the chuck body in light of the high occurring forces during use, it has appropriate connecting means that can engage with the work piece table. The rotating part of the lathe chuck is then connected via a connecting means penetrating through the work piece table with the adapter fitting on the drive shaft, and can thus be rotated via this.

In the case that a clamping device as described before is arranged on the work piece table as well as in the alternative embodiment with a lathe chuck it is seen as favorable if the adapter fitting is located between the supporting points or in the surface defined by the supporting points. Thus then a highly accurate centering of adapter fitting and means for power transmission of the clamping device or the lathe chuck becomes possible.

It is seen as particularly advantageous if the lathe chuck is supported on the work piece carrier wherein the work piece carrier or a rotary table provided on it provides a sliding surface for the lathe chuck. This is the simplest way of using the machine tool according to the invention with a lathe chuck. Here only the clamping device with the supporting plate carrying the work piece and means for power transmission are removed from the work piece carrier by releasing the corresponding connecting means connecting the supporting plate with the work piece carrier, and the means for power transmission with the drive shaft or the adapter fitting arranged on it. Then the work piece carrier is ready for arranging the lathe chuck. This is then arranged via suitable coupling points on the drive shaft or the adapter piece or adapter fitting, and is then ready for clamping work pieces and for the rotary machining. The lathe chuck itself is here supported on the work piece carrier that then provides the sliding surface. Via suitable lubricating points also a lubrication of the lathe chuck can be provided.

Another preferred embodiment of the machine tool provides that the lathe chuck has a chuck body and a rotating spindle. The chuck body is supported here in particular on several supporting points on the work piece carrier, while the spindle is supported pivoted in the chuck body. The chuck body forming a bearing for the spindle is here connected releasable fixedly with the work piece carrier. This connection can be carried out by engagement and/or screwing of chuck body or lathe chuck and work piece carrier or rotary table or in another way. The spindle supported in the chuck body is connected with the drive shaft for which purpose again an appropriate adapter fitting, that may be designed for example as quick connection link, quick coupling, claw coupling, screw connection or bayonet connector, is provided. Through this then a particularly fast and simple resetting of the machine tool is possible so that the work piece carrier is not available here for a stationary or almost stationary arrangement of work pieces for machining by rotating tools, but rather also the chance is created of providing work pieces or clamping means, that is clamping or lathe chucks, that allow a machining when the work piece rotates.

In the machine tool described before a fixing of the work piece in the lathe chuck is provided to carry out here a machining when the work piece rotates. For fixing the work piece in the lathe chuck, here, in particular, a mechanic, hydraulic, pneumatic electric-mechanic, electric-magnetic clamping of the work piece is provided in the lathe chuck. Suitable clamping means acting on the jaws of the lathe chuck or the work piece can be accommodated, for example, in the chuck body. The chuck body can have here, for example, a stationary part with the appropriate clamping means or the drives for these clamping means. The chuck then has the required operating means for this.

Another embodiment of the machine tool seen as advantageous provides a common control for the before described application, that means for the use of a clamping device for the stationary fixing of a work piece as well as for the use of a machine tool for machining a rotating work piece. It has been proven as particularly favorable in this connection when for that a separate control is provided in the machine tool, or the control is provided for the respective applications, that is for operating the clamping device or the lathe chuck through the control of the machine tool. Conventional machine tools have sufficient resources to integrate here additional controls in already existing machine controls and operating elements provided as a rule on the machine tool or its control, to add another control to the corresponding elements of the machine tool.

In connection with the control provided in the machine tool it is seen as convenient if the clamping of the work piece in the clamping device and/or in the lathe chuck can be controlled by the control. Here clamping parameters, such as clamping pressure, clamping speed and the like, can be controlled by the control and thus a perfect centering of the work pieces as well as the perfect use of the machine tool can be carried out. The machining parameters, such as, for example, the use of the tool, angling the tool on the rotating work piece or releasing or clamping the work piece in the clamping device, that also can be used in the machine tool, can be controlled.

Another advantageous embodiment of the machine tool is characterized in that a fixing or releasing of the clamping device or the lathe chuck and/or the clamping jaws arranged on it can be carried out automatically, manually or only partly automatically or partly manually. The machine tool or suitable elements provided in it then effect a fixing or releasing of the clamping device or the lathe chuck if this is preset, for example, by the control. Besides, there is also the possibility that a user interferes here and triggers or operates a corresponding mechanical system for fixing or releasing the clamping device or the lathe chuck, and, after that, removes the corresponding machine parts manually or inserts in the corresponding mountings.

In connection with the automatic or manual fixing or releasing of the clamping device a preferred embodiment of the machine tool provides that here an automatic or manual engagement of the adapter fitting in the clamping device and/or the lathe chuck is provided. This engagement can also be realized through the machine control, however, there is also the possibility that here the adapter fitting is operated appropriately.

It is seen as favorable if the adapter fitting has means for fixing and/or releasing the clamping device or the lathe chuck. Means of this kind can be, for example, the already mentioned quick connection links, a quick coupling, a claw coupling, a screw connection or a bayonet connector. These again can be operated manually as well as automatically. The means are here accessible for the user in such a way that a manual operation is possible.

Because of the before mentioned automatic as well as manual operation provided by the machine tool it can be used in many ways, and is suitable for the embodiment as small, medium or large machine, that means for the large scale use as well as for the use in a small series production or in even smaller business.

Thus the machine tool according to the invention is double useful, and allows a more efficient use of the machine tool.

BRIEF DESCRIPTION OF THE DIFFERENT VIEWS OF THE DRAWINGS

Figure 2:
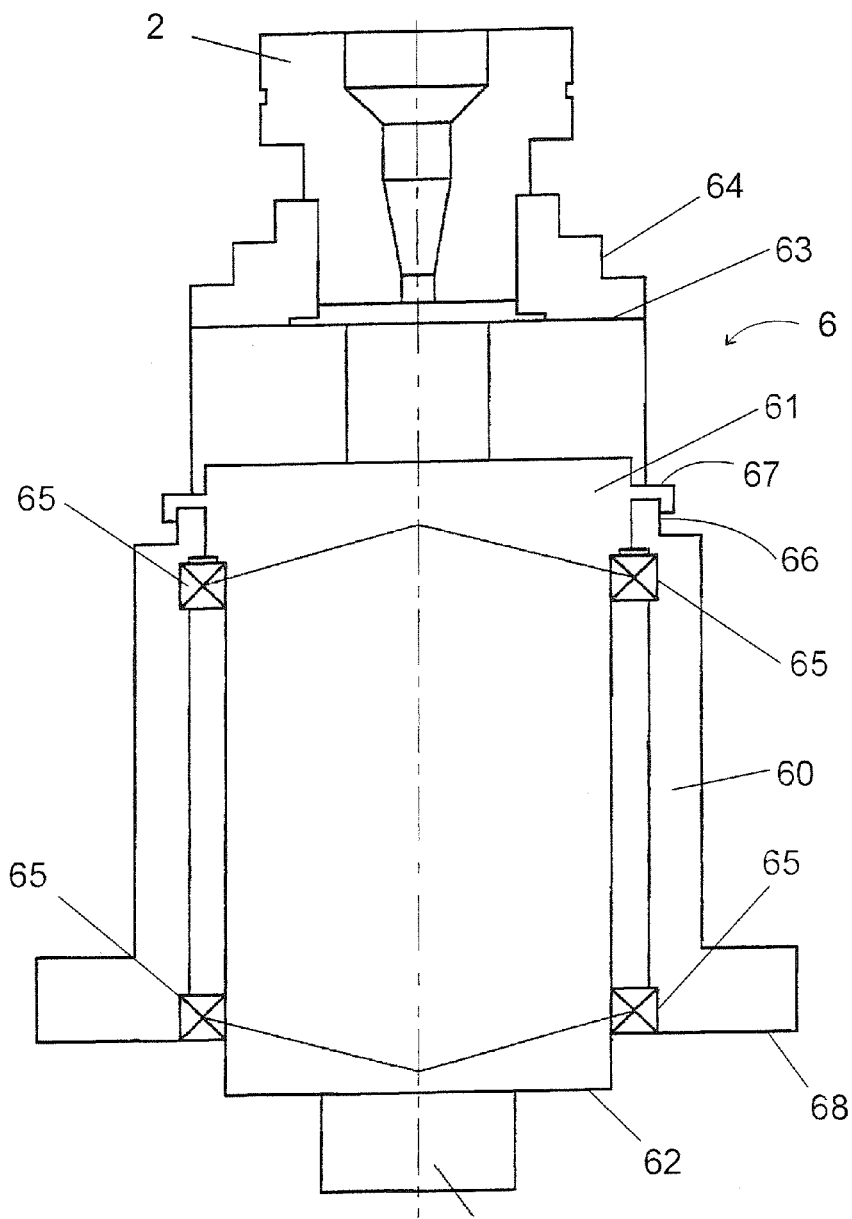
Figure 3:
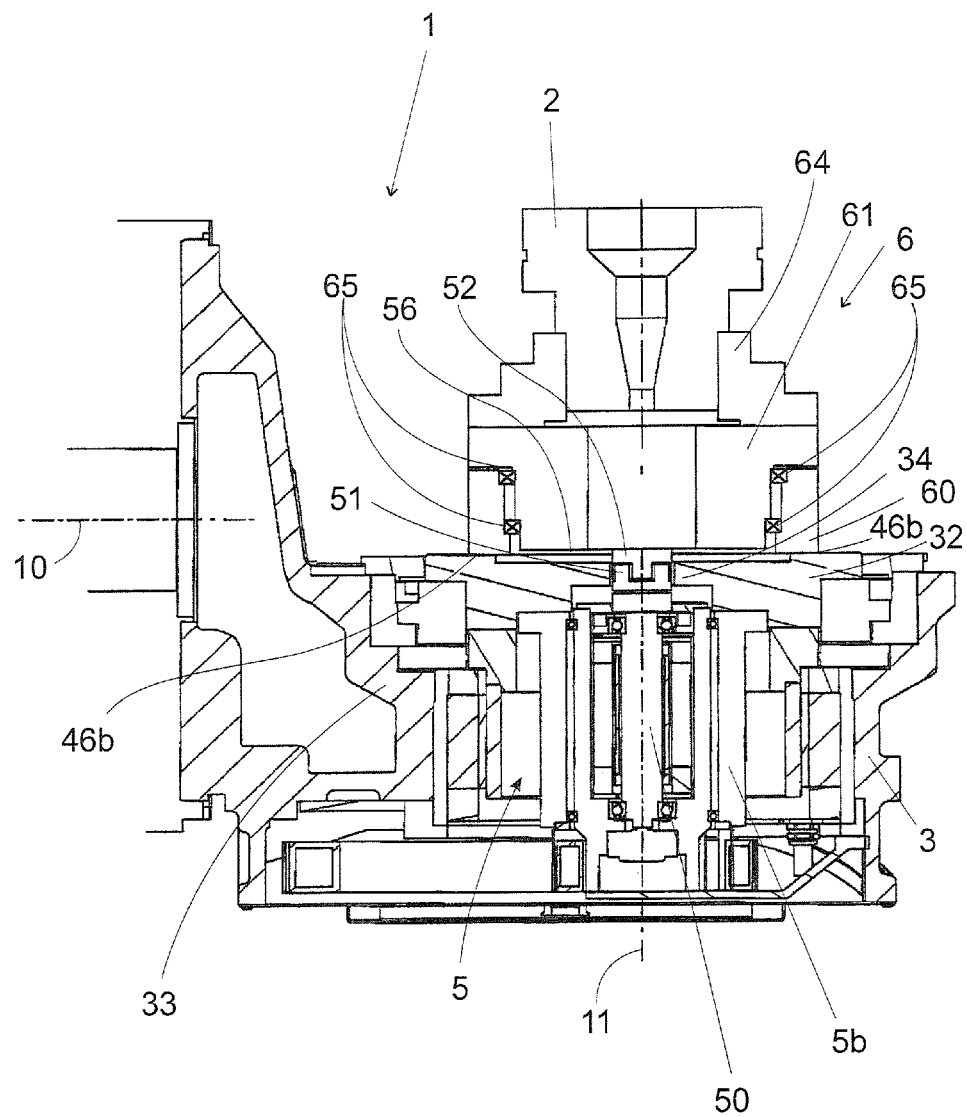

In the drawing the invention is shown schematically, in particular in examples. In the figures:

FIG. 1 a side view of the machine tool according to the invention,

FIG. 2 in a side view a lathe chuck that can be used in the machine tool according to the invention and FIG. 3 a side view of another embodiment of the machine tool according to the invention.

DETAILED DESCRIPTION OF THE PREFERRED DESIGN

In the figures identical or corresponding elements each are indicated by the same reference numbers, and therefore are, if not useful, not described anew.

In FIG. 1 the machine tool 1 is shown schematically. It comprises, first of all, a work piece table 3 with a work piece carrier 33 providing a rotary table 32. The rotary table 32 provides here the supporting surface for a clamping device 4 or a lathe or jaw chuck 6 (see FIG. 3).

FIG. 1 does not show the machining tool designed, for example, as rotating drill or milling cutter, driven by a tool spindle and movable in a suitable way relatively to the work piece 2. Besides a movable embodiment of the tool or of the tool with a rotating tool spindle, there is, of course, also the possibility that the tool itself is stationary or not rotating, for example designed as lathe tool or caulker, and instead the work piece 2 clamped in a lathe or jaw chuck 6 moves.

The machine tool 1 according to the invention has a number of axes. In the embodiment of the machine tool 1 shown in FIGS. 1 and 3 it is provided, in order to reach a machining of the work piece 2 as flexible as possible, to position it relatively to a machining tool along three spatial axes. Besides the longitudinal axes also rotational axes are provided. A first rotational axis is indicated by reference number 10. It allows a rotation of the work piece table 3 around a horizontally orientated rotational axis 10. The arrangement is here chosen such that the work piece table 3 has a console 30 arranged, for example, on one side on a slide or a pillar 12. When the design is slide-like, for example, also a motion in vertical direction, that is rectangular to the rotational axis 10, is possible.

Furthermore it is provided that the work piece 2 can rotate around another rotational axis 11, orientated in FIGS. 1 and 3 vertically. As the orientation of this rotational axis depends on the position of the console 30 around the rotational axis 10, of course, the second rotational axis 11 is not determined. However, it is rectangular to the first rotational axis 10.

For rotating the work piece 2 around the second axis 11, on the machine tool 1 a preferably electrically designed rotary drive 13 is provided. In the example of FIGS. 1 and 3 the rotation function of the work piece table 3 around several spatial axes 10, 11 is shown. Of course, the embodiment of a machine tool according to the invention can also be realized when such a rotation function is not provided at all or is provided only partly, that means the work piece table 3 is designed, for example, movable only along the longitudinal axes or completely held, that means stationary. In this respect the invention is free in the division of the different motion or rotational axes to the positioning of the work piece 2 or the machining tool.

Instead of the console-like design of the work piece table 3 shown here, of course, also a portal-like design is possible.

In the example of FIG. 1 the machine tool according to the invention is shown with resting work piece 2. The work piece 2 to be machined is here clamped on a supporting plate 42 by means of the clamping device 4. This supporting plate 42 is part of clamping device 4 that can be exchanged or removed from the work piece table 3 in the machine tool 1 according to the invention. The clamping device 4 on the supporting plate 42 has several clamping elements 40, 40'. The single clamping elements 40, 40' are designed essentially identically, and have a laterally projecting clamping claw 41, 41' provided longitudinally moving on the clamping element 40, 40'. The clamping claw 41, 41' engages in defined positions on the work piece 2 and pushes it during machining to the supporting plate 42. Besides this direct connection, it is, of course, also possible that the clamping claw 41, 41' holds the work piece 2 indirectly, for example, when the work piece 2 is fastened to a work piece carrier or a pallet or the like. Below the work piece 2 supporting blocks 45 are arranged on the supporting plate 42 providing a supporting point 44 with defined supporting position for the work piece 2. The supporting blocks 45 are also attached to the supporting plate 42. The supporting plate 42 itself is supported via the supporting points 46a on the work piece tables 3 or the work piece carrier 33.

The clamping claws 41, 41' are longitudinally movable rectangular to the surface of the supporting plate 42. This longitudinal motion is realized, for example, by a spindle drive in the clamping element 40, 40', where the clamping claws 41, 41' are parts of spindle nuts running on a driven spindle. Coaxially on this spindles, toothed wheels 43 are provided connected via a means 53 for power transmission with a central drive 55. The means 53 for power transmission can be provided, for example, as chain or the like. The design and guide of the means 53 for transmission is chosen here such that all clamping elements 40, 40' are driven in the same way by the central drive 55. The central drive 55 again is in connection via a motor shaft connecting piece 52 with a driving motor 5 providing the driving power that is designed preferably as electric motor 5a or hydraulic motor 5b. The driving motor 5 drives a drive shaft 50 connected via an adapter fitting 51 with the motor shaft connecting piece 52 of the central drive 55 of the clamping device 4. The driving motor serves, in the example of FIG. 1, as drive for the clamping device 4. The central drive 55 connected with the driving motor 5 has accordingly a driving pinion and/or gear effecting a power transmission from the driving motor 5 to the means 53 for power transmission. It is convenient here that by a reversing of the rotational direction of the driving motor 5 the opening and closing movement of the clamping claws 41, 41' can be influenced. The central drive 55 as well as the means 53 for power transmission and the driving pinions and/or the gear 54 are here received in the supporting plate 42, and designed as a unit that can be removed on demand from the work piece table 3 or the work piece carrier 33. By releasing the central drive 55 from the drive shaft 50 of the driving motor 5 the entire clamping device 4, that means the supporting plate 42 containing the central drive 55, the means 53 for power transmission and the appropriate drive pinions or the gear, the clamping elements 40, 40' arranged on it as well as the clamping claws 41, 41' provided on it can be removed from the machine tool 1 or the work piece 3. After removing the clamping device 4 it is only the work piece carrier 33 with the rotary table 32 provided in it that remains on the work piece table 3. Centrally arranged in the rotary table 32 is the adapter fitting 51 that is available optionally for the arrangement of the clamping device 4 or a lathe or jaw chuck 6. The adapter fitting 51 is here located between the supporting points 46a or in the surface 47 defined by them. It is an advantage of the machine tool 1 that as central part of the invention the use of a motor, preferably as electric motor 5a, or hydraulic motor 5b is provided in the immediate vicinity to the work piece 2. The drive shaft 50 driven by the motor 5 acts here as directly as possible, for example, via the drive shaft 50 itself, via a gear, another means 53 for power transmission or via a hydraulic line on the clamping device that can be connected to the machine tool on demand, and imprints a corresponding clamping power in the clamping elements 40, 40' of the clamping device 4, so that the work piece 2 can be held reliably. Alternatively, for the power transmission from drive 5 to the drive shaft 50 an additional gear 54 can be provided.

In the clamping device between the spindle in the clamping element 40, 40' (not shown) and the chain drive, that means the central drive 55 and the means 53 for power transmission connected with it or the toothed wheels associated to the clamping elements 40, 40' or other elements, a sliding clutch is provided in which the clamping power of the clamping element 40, 40' can be restricted. The clamping power is here maintained by a self-locking gear, a self-locking motor or another brake.

By monitoring the power consumption of the driving motor it is possible to monitor the single clamping states of the clamping elements 40, 40', and to influence them accordingly. A free wheel is provided on the claw drives as well as on the gear pinions to achieve the reopening of the clamping elements 40, 40'.

The complete clamping device 4 can be removed from the work piece table so that on the work piece table 3 only the rotary table 32 of the work piece carrier 33 as well as the drive shaft 50 and the drive motor 5 associated to it remains, and for arranging of other alternative elements the machine tool 1 according to the invention is available. A lathe or jaw chuck 6, in which a work piece can be clamped, can be arranged through the adapter fitting 51. The machine tool 1 according to the invention therefore makes a resetting from milling machining to turning on a lathe and vice versa possible on short notice.

FIG. 2 shows a lathe or jaw chuck 6. This comprises in the embodiment of FIG. 2 a chuck body 60 that can be connected fixedly with the rotary table 32 (see FIG. 3), and serves as receiver for the rotating spindle 61 of the lathe or jaw chuck 6. The spindle 61 is, in the example of FIG. 2, supported via two bearings 65 in the interior of the chuck body, and has on its bottom end 62 facing in mounted condition the work piece table 3 or the rotary table 32 a motor shaft connecting piece 52. This motor shaft connecting piece 52 is engaged during mounting of the chuck with the adapter fitting 51 of the drive shaft 50 so that a direct drive of the spindle 61 can be carried out. On its top end 63 opposite the motor shaft connecting piece 52 the spindle 61 has jaws 64 serving for clamping a work piece 2 in or at the spindle 61. The lathe or jaw chuck 6 shown here can be designed as two, three or multiple jaw chuck, and thus provides a number of clamping options for different work pieces 2. In the chuck body 60 there are two bearings 65 shown highly schematically in FIG. 2. These may be a ball, slide or rolling bearing. The part of the spindle 61 projecting beyond the chuck body 60 has additionally projections 67 gripping over the upper edge 66 of the chuck body 60 through which the centering of the spindle 61 in the chuck body 60 is improved. Thus a highly accurate machining of the held work pieces 2 is possible. The chuck body 60 can be connected with the rotary table 32 via appropriate holding means (not shown in FIG. 2). The holding means are here designed in such a way that also with a high number of revolutions and thus large forces acting on the lathe or jaw chuck 6 a permanent and reliably positioned connection of the lathe or jaw chuck 6 to the rotary table 32 is secured. The supporting surfaces 68 between the chuck body 60 and the rotary table 32 are here chosen sufficiently large to guarantee this fit. The rotary table 32 can serve here as sliding surface 56 for the rotating chuck supported without other fastening on the rotary table, if the embodiment of the lathe or jaw chuck 6 only connected with the drive shaft 50 is simpler.

FIG. 3 shows another preferred embodiment of the machine tool 1 according to the invention. This comprises the parts and functions already described in connection with FIG. 1. Instead of the clamping device 4 shown there the machine tool shown in FIG. 3 has a lathe or jaw chuck 6 arranged on the work piece table 3 or the work piece carrier 33, shown in FIG. 2. This is supported on the rotary table 32 provided in the work piece carrier 33 via supporting points 46b. The lathe or jaw chuck 6 has a motor shaft connection piece 52 inserted in a recess 34 in the rotary table 32 and connected with an adapter fitting 51 of the drive shaft 50. A transmission of power is then carried out via this from the driving motor 5 also received in the work piece table 3. Besides the use of an electric motor 5a as driving motor 5 there is also, of course, the opportunity of providing here a hydraulic motor 5b as drive for the drive shaft 50 or the lathe or jaw chuck 6 arranged on it. The lathe or jaw chuck 6 has a chuck body 60 that is fixedly connected with the rotary table 32, preferably screwed in it or clamped together with it in another suitable way. Bearings 65 through which the spindle 61 of the lathe or jaw chuck 6 is supported pivoted in the chuck body 60 are provided in the chuck body 60. The bearings 65 are shown schematically in the example of FIG. 3, and can be designed as ball, slide or rolling bearing or in any other suitable way. Jaws 64 for clamping the work piece 2 are arranged in the spindle 61. There is also the possibility with reference to the jaws 64 of providing very different forms of jaws as well as different numbers of jaws on the spindle 61.

As described before in connection with FIG. 1 the machine tool 1 according to the invention allows removing of the supporting plate 42 with the clamping device 4 arranged on it from the work piece table 3. On the end of the drive shaft 50 distanced from the drive motor 5 the free adapter fitting 51 is located after the supporting plate 42 has been removed. In this the motor shaft connection piece 52 of the lathe or jaw chuck 6 projects in the same way, and can be connected via appropriate connecting means with the drive shaft 50.

By the way, the lathe or jaw chuck 6 is designed as usual, and allows a radial gripping of the work piece 2. As shown in FIG. 3, the chuck body 60 of the lathe or jaw chuck 6 is supported on the rotary table 32 of the work piece table 3, and is connected to it in a suitable way with additional connection or fastening means. Besides, however, there is also the possibility that the rotary table 32 provides a sliding surface 56 for the chuck body 60, and no separate spindle 61 supported in the chuck body 61 is provided, but clamping of the work piece 2 is carried out directly via the jaw 64 guided for the chuck body 60.

Rotating the drive shaft 50 sets the pivoted supported spindle 61 in rotation. A stationary tool that may be provided in the machine tool 1, for example a lathe tool or caulker, can be angled towards the work piece 2 and removes then material. By a corresponding change of position of the tool then a corresponding machining of the work piece 2 can be carried out. During angling the tool towards the work piece 2 its positioning can also be carried out by an appropriate orientation of the work piece table via the rotational axes 10, 11, described in connection with FIG. 1, so that a perfect orientation of the work piece 2 with respect to the tool is given. By means of this then the perfect machining position is defined, and the flexibility of the machine tool 1 according to the invention is enhanced.

Among others, the invention is described in connection with a drive, commonly referred to as electric motor 5a. This can be also a synchronous motor, asynchronous motor or direct current motor. The synchronous mote can be designed as sensorless synchronous motor and here as permanent magnet excited synchronous motor, and allow a sensorless rotor position or standstill position recognition.

Although the invention has been described by exact examples that are illustrated in the most extensive detail, it is pointed out, that this serves only for illustration, and that the invention is not necessarily limited to it because alternative embodiments and methods become clear for experts in view of the disclosure. Accordingly, changes can be considered that can be made without departing from the contents of the described invention.

The invention claimed is:

1. A machine tool configured to process one of a rotating or a non-rotating workpiece, the machine tool comprising:
   a workpiece holder for carrying the workpiece, the workpiece holder having one drive shaft directly driven by a drive and one adapter connector for interchangeably connecting the drive or drive shaft in a fast release connection with at least one of:
   a power transmission assembly for a clamping device, the clamping device being configured to directly or indirectly clamp the workpiece for machining of the non-rotating workpiece; or
   a chuck for directly receiving and rotating the workpiece for grinding or turning processing,
   the adapter connector comprising at least one of: a releasable connection, a releasable coupling, a claw coupling, and a bayonet connection; and
   the machine tool comprising a first use case and a second use case such that in the first use the drive or drive shaft is connected with the power transmission, with the drive being configured for the activation of the clamping device, and
   wherein in the second use case the drive or drive shaft is connected with the chuck for directly or indirectly receiving the workpiece for a rotational grinding or turning processing of the workpiece, with the drive being configured to drive the rotation of the chuck,
   wherein the machine tool is used both for machining the non-rotating work piece with a rotational machining tool and for a rotational processing of the rotating workpiece with a non-rotating tool.

2. The machine tool according to claim 1, wherein the workpiece holder is stationary.

3. The machine tool according to claim 1 wherein the workpiece holder is at least one of: mobile; and rotatable at least along/around one axis.

4. The machine tool according to claim 1, wherein the drive comprises at least one of an electric motor, a servo motor, and a hydraulic motor, and the drive acts directly or indirectly, via a gearing, on the drive shaft.

5. The machine tool according to claim 4, wherein the electric motor or the servo motor is configured as at least one of: a synchronous motor, an asynchronous motor, a direct current motor, a sensorless synchronous motor, a asynchronous motor, and a permanent magnet synchronous motor (PMSM).

6. The machine tool according to claim 5, wherein the electric motor or the servo motor is configured as a synchronous motor, and wherein the synchronous motor comprises sensorless standstill detection and wherein rotor position detection is performed by at least one of a software program and NC control.

7. The machine tool according to claim 1, wherein the adapter connector is located between support points provided at the workpiece holder or in an area limited by the support points.

8. The machine tool according to claim 1, wherein the clamping device has a support plate for holding the workpiece and that the support plate is connected or supported by several support points situated on the workpiece holder or on a round table located within the workpiece holder.

9. The machine tool according to claim 1, wherein the clamping device has at least one clamping element and the clamping element is activated through the power transmission assembly provided within the clamping device.

10. The machine tool according to claim 9, wherein the clamping elements are interconnected with a central drive through the power transmission assembly, wherein the central drive is connected with the drive shaft.

11. The machine tool according to claim 1, wherein the chuck is supported by the workpiece holder or by the round table within the workpiece holder, wherein the workpiece holder or the round table can provide a sliding surface for the chuck and/or in that the chuck has a rotating spindle, held within a chuck housing which is interconnected or supported by the workpiece holder by several support points, wherein the spindle can be connected with the adapter connector and/or with the drive shaft.

12. The machine tool according to claim 1, wherein a mechanical, hydraulical, pneumatical, electromechanical or electromagnetical clamping or releasing of the workpiece is provided within the chuck.

13. The machine tool according to claim 1, wherein a common control is provided for the first use case and the second use case and, wherein the control is provided as a separate control or is provided by the control of the machine tool.

14. The machine tool according to claim 13, wherein clamping of the work piece in the clamping device or in the chuck is controlled by the control.

15. The machine tool according to claim 1, wherein an immobilization or a release of the clamping device or of the chuck can be performed automatically, manually, partially automatically or partially manually.

16. The machine tool according to claim 1, wherein an automatic or manual engagement of the adapter connector with the clamping device or the chuck is provided.

17. The machine tool according to claim 1, wherein the adapter connector comprises means to immobilize or to release the clamping device or the chuck.

18. A method of processing a workpiece, comprising providing the machine tool of claim 1; and processing of the workpiece with rotating machining tools or in a rotational processing.

* * * * *